(12) United States Patent
Brandauer et al.

(10) Patent No.: US 9,902,284 B2
(45) Date of Patent: *Feb. 27, 2018

(54) HEATING AND COOLING APPARATUS FOR A BATTERY

(71) Applicants: Mahle International GmbH, Stuttgart (DE); Behr France Rouffach SAS, Rouffach (FR)

(72) Inventors: Jakob Brandauer, Vaihingen/Enz (DE); Stefan Hirsch, Stuttgart (DE); Pascal Miss, Selestat (FR); Bernd Schaefer, Stuttgart (DE); Joachim Treier, Oppenau (DE); Stephane Weingaertner, Pfaffenheim (FR)

(73) Assignees: Mahle International GmbH (DE); Behr France Rouffach SAS (FR)

( * ) Notice: Subject to any disclaimer, the term of this patent is extended or adjusted under 35 U.S.C. 154(b) by 561 days.

This patent is subject to a terminal disclaimer.

(21) Appl. No.: 14/500,987

(22) Filed: Sep. 29, 2014

(65) Prior Publication Data

US 2015/0090427 A1 Apr. 2, 2015

(30) Foreign Application Priority Data

Sep. 30, 2013 (EP) .................................... 13186713

(51) Int. Cl.
*B60L 11/18* (2006.01)
*H01M 10/615* (2014.01)
(Continued)

(52) U.S. Cl.
CPC ....... *B60L 11/1879* (2013.01); *B60L 11/1874* (2013.01); *B60L 11/1875* (2013.01);
(Continued)

(58) Field of Classification Search
CPC .............. B60L 11/1879; B60L 11/1875; B60L 11/1874; B60L 2240/545; H01M 10/625;
(Continued)

(56) References Cited

U.S. PATENT DOCUMENTS

| 2011/0318628 A1* | 12/2011 | Heim ................ H01M 10/5004 429/120 |
| 2012/0107665 A1* | 5/2012 | Abe .................... H01M 2/1016 429/120 |

(Continued)

FOREIGN PATENT DOCUMENTS

| DE | 102009058810 A1 | 6/2011 |
| DE | 102010038781 A1 | 2/2012 |

(Continued)

OTHER PUBLICATIONS

Machine translation of JP 2011181224 A (Sep. 2011).*

(Continued)

*Primary Examiner* — Eugenia Wang
(74) *Attorney, Agent, or Firm* — Fishman Stewart PLLC (57) ABSTRACT

A heating and cooling apparatus for a battery may include a base plate in which at least one fluid path for flowing-through of at least one of a coolant and a refrigerant is provided. At least one support part may be provided, in which in each case at least one electrical heating element is provided that is thermally coupled to the base plate. The heating and cooling apparatus may include a cover plate. The base plate, the at least one support part and the cover plate may be arranged adjacent to one another along a stack direction.

21 Claims, 5 Drawing Sheets

(51) Int. Cl.
  H01M 10/6556    (2014.01)
  H01M 10/625     (2014.01)
  H01M 10/6571    (2014.01)
  H01M 10/613     (2014.01)
  F28D 9/00       (2006.01)

(52) U.S. Cl.
  CPC ....... *H01M 10/613* (2015.04); *H01M 10/615* (2015.04); *H01M 10/625* (2015.04); *H01M 10/6556* (2015.04); *H01M 10/6571* (2015.04); *B60L 2240/545* (2013.01); *F28D 9/0081* (2013.01); *Y02T 10/705* (2013.01); *Y02T 10/7005* (2013.01)

(58) Field of Classification Search
  CPC ......... H01M 10/6556; H01M 10/6571; H01M 10/613; H01M 10/615; Y02T 10/705; Y02T 10/7005; F28D 9/0081
  See application file for complete search history.

(56) References Cited

U.S. PATENT DOCUMENTS

2013/0250512 A1*   9/2013   Ludwig ................. F28F 1/00
                                                    361/689
2014/0013774 A1*   1/2014   Grunwald ............ F25B 21/02
                                                    62/3.2

FOREIGN PATENT DOCUMENTS

| DE | 102011003296 A1 | 8/2012 | |
| DE | 102011003535 A1 | 8/2012 | |
| EP | 2388851 A1 | 11/2011 | |
| JP | 2011181224 A * | 9/2011 | |
| WO | WO-97/16050 A2 | 5/1997 | |
| WO | WO 2012072348 A1 * | 6/2012 | ............... F28F 1/00 |
| WO | WO-2012/113890 A1 | 8/2012 | |

OTHER PUBLICATIONS

English abstract for DE-1022010038781.
English abstract for DE-102011003296.
English abstract for DE-102011003535.
English abstract for DE-102009058810.
EP Search Report for EP-13186713.7, dated Sep. 30, 2014.
English abstract for EP-2388851.

* cited by examiner

HEATING AND COOLING APPARATUS FOR A BATTERY

CROSS-REFERENCE TO RELATED APPLICATIONS

This application claims priority to European Patent Application No. 13186713.7, filed Sep. 30, 2013, the contents of which are hereby incorporated by reference in their entirety.

TECHNICAL FIELD

The present invention relates to a heating and cooling apparatus for a battery arrangement with such a heating and cooling apparatus. The invention furthermore relates to a motor vehicle with such a battery arrangement.

BACKGROUND

Rechargeable battery systems for electric vehicles with purely electric drive and for hybrid vehicles and vehicles with fuel cell drive are the subject of current research. At present, preferably lithium-ion batteries are employed in the mentioned vehicle types, which are characterized by a high energy density and only a slight undesirable memory effect. The ability of a rechargeable battery to reliably supply electric consumers installed in motor vehicles with electric energy substantially depends on the thermal conditions prevailing in the surroundings of the battery. For the electrochemical processes which take place both during the provision and also during the absorption of electric energy—in the sense of recharging—which take place in the battery are dependent to a not unsubstantial degree on the operating temperature of the battery. Extensive research on different battery systems on lithium-ion basis have shown for example that below a critical temperature, for example in the region of approximately 0° C., the electric energy density made available by the battery greatly decreases compared with higher operating temperatures. Below this temperature, damaging of the Li-ion cell can additionally occur during charging.

Decisive for a reliable and trouble free operation of said batteries—this does not only apply to mentioned batteries on lithium-ion basis but generally also to any rechargeable battery systems—is also the creation of thermally well-defined ambient conditions. With a view to the substantial temperature fluctuations that occur during operation for example in a motor vehicle, this means that these have to be balanced through suitable temperature control devices which are thermally coupled to the battery in order to keep the ambient temperature of the battery—and thus also the temperature of the battery itself—constant within a predetermined temperature interval. Such a device has to be able on the one hand to increase the ambient temperature in the direct surroundings of the battery should the latter assume a value that is below the permissible temperature range. On the other hand, it must also be possible to lower the ambient temperature in the case that the latter exceeds this said temperature interval in upward direction.

From the prior art, various devices that can be thermally coupled to a battery are known, which as a rule comprise both a heating unit for increasing the battery temperature and also a cooling system for lowering the battery temperature.

Accordingly, a device for heating and cooling of a battery is described in DE 10 2009 90 588 19 A1, which comprises a coolant circuit and at least one electric heating element, both of which are arranged in a common heat transfer component. The electric heating element in this case is connected to the heat transfer component in a positively and/or non-positively joined manner. Characteristic for the device is that it requires a relatively large number of building elements, which during a heating operation are co-heated by the heating element due to the design, which significantly increases the heating output required for the actually aspired heating of the battery.

SUMMARY

The invention is therefore based on the object of creating a heating and cooling apparatus for a battery which is characterized by effective thermal coupling to the battery to be heated or to be cooled and is characterized at the same time by a simple design structure with a low number of components. The invention furthermore has the object of expanding a battery arrangement with a battery to be temperature-controlled by such a heating and cooling apparatus. Finally, the invention has the object of stating a motor vehicle with such a battery arrangement.

The mentioned objects according to the invention are solved through the subject of the independent patent claims. Preferred embodiments are subject of the dependent claims.

Accordingly, the basic idea of the invention is to form a heating and cooling apparatus for a battery plate-like with a base plate and a cover plate and to arrange in the region between base plate and cover plate both heating and also cooling elements for heating and cooling respectively of a battery that is thermally coupled to the base plate. This allows keeping the number of components required for producing such a heating and cooling apparatus low so that the thermal losses of such an apparatus can likewise be kept low. The stack-like arrangement of the individual plate-like components of the heating and cooling apparatus additionally makes possible an areal and thus highly-effective thermal connection of the battery to the heating and cooling apparatus with simultaneously very compact design of the same.

Particularly little installation space is claimed by a preferred embodiment, in which the support part is designed as an elongated support frame extending along a longitudinal direction. The at least two passage openings are arranged in the longitudinal direction spaced from and adjacent to one another in the support frame, and a heating element each inserted in the at least two passage openings.

In order to be able to realise the heating and cooling apparatus in a flat design, a design of the heating elements and of the support frame such that the top sides of the at least two heating elements in each case terminate flush with a top side of the support frame is recommended. Accordingly, the bottom sides of the at least two heating elements each should terminate flush with a bottom side (21b) of the support frame.

Preferentially, an electrically insulating insulation can be provided on the heating and cooling apparatus, which is arranged in the heating and cooling apparatus between base plate and support part. Said insulation prevents undesirable electrical contact of the electric heating elements with the base plate which is typically produced from a metal, i.e. is electrically conductive, which performs a housing function and can thus be exposed on the outside to body contact by a user. In order not to unnecessarily lower the thermal coupling of the heating elements to the base plate the insulation should have as high as possible a heat conductivity.

In a preferred embodiment, the heating and cooling apparatus comprises exactly one support part designed as a support plate with at least two passage openings, in each of which an electric heating element is arranged. Such a modular construction of the heating apparatus with separate heating elements, which are employed in a common support plate, proves to be particularly advantageous in terms of production. For optimal thermal coupling of the heating elements to the support plate it is recommended to dimension these with respective to their spatial dimensions in such a manner that they preferably completely fill out said passage openings. To this end, the individual heating elements can be configured in particular in the manner of heating plates, which preferably completely fill out the respective passage opening in a state in which they are mounted in the support plate. Fastening the heating elements to the support part is preferably effected with the help of a suitable adhesive which is advantageously characterized by a high heat conductivity. A particularly precise assembly of the heating elements in the passage openings is achieved in that suitable protrusions projecting towards the inside in the passage opening are provided on the edge region of the support part surrounding the passage openings, which during the inserting of the heating elements act in the manner of a stop.

In order to supply the electric heating elements of the heating and cooling apparatus with electric energy, it is obvious to provide both between the support part and the cover plate as well as between the support part and the insulation an electrically conductive contact plate which for supplying the heating elements with electric energy from an external energy supply unit is electrically connected to the heating elements. The insulation that is provided between support part and base plate in this case can be formed as an insulating plate from an electrically insulating material or as an insulating film arranged on the base plate of an electrically insulating material or as an electrically insulating layer applied onto the base plate.

The two electrical contact plates follow the principle of action of conventional electrical lines which make possible the transport of electric energy from the energy supply unit to the electric heating elements. On the heating elements which are designed plate-like, electrically conductive connection elements can be provided on both sides in such a manner that the desired electrical contact between heating element and contact plates is created even through the mechanical contact between these two components that is established in the assembled state of the heating and cooling apparatus. Particularly elegant in terms of production proves to be a version in which on the plate-like heating elements no separate electrical connection elements are provided, but the top and bottom side of the heating elements—at least in regions—are designed electrically conductive. The desired electrical connection between heating element and contact plate is thus automatically established upon the assembly of the respective contact plate on the heating element. The two contact plates can each be glued to the electric heating elements by means of an electrically conductive or non-conductive adhesive. When using an electrically non-conductive adhesive, contacting is effected via the roughness of the surfaces. On each of the two electrical contact plates a connection element can be provided laterally on the outside, which allows connection to a positive or negative terminal of the energy supply unit.

Particularly practically, the battery to be temperature-controlled by means of the heating and cooling apparatus itself can be used as electric energy supply unit in this case.

Particularly practically, at least four, preferentially 15, maximally preferentially 20 of such passage openings with respective heating elements can be provided in the support part, which with respect to a top view onto the support part are arranged grid-like on the same. Depending on the desired heating output to be achieved in total, another number of such heating elements can also be provided. The proposed grid-like arrangement of the heating elements is recommended in particular when the heat generated by the heating elements is to lead to as even as possible a lateral heating of the base plate. It is clear that instead of said grid-like arrangement geometry however, other forms of the arrangement of the heating elements relative to one another are also possible in principle.

Alternatively to the above described configuration of the heating and cooling apparatus with a single support part, it is obvious according to an advantageous further development to provide two preferentially three such support parts which can in each case be designed as substantially rectangular support frames. The insulation in this case is designed as an insulating plate in which at least two passage openings which are complementary to the support parts are provided. Each support part in this case is provided with at least two passage openings, into each of which a heating element can be inserted so that it preferentially completely fills out these. Fixing the electric heating elements in the passage openings can be effected by means of gluing. A design structure of the heating and cooling apparatus with multiple support parts proves to be particularly simple to assemble since each support part can be initially equipped with heating elements separately. The preassembled support parts can thus be inserted in the passage openings provided in the insulating plate as a unit and subsequently glued to the insulating plate.

Advantageously, the passage openings provided in the insulating plate are substantially designed rectangular in shape. Alternatively or additionally, this can also be provided for the passage openings provided in the support part.

According to an advantageous further development, which permits electrical contacting of the heating elements that can be easily realised technically, it is proposed to provide for each support part two individual electrical contact plates each, preferentially of a metal, which are inserted in the support part that is designed as support frame so that they directly contact the top or bottom side of the heating elements. In such an assembled state of the electrical contact plates, the heating elements are arranged in the passage openings of the support part sandwich-like between the two electrical contact plates. The two electrical contact plates can be glued to the heating elements by means of an electrically conductive or non-conductive adhesive.

Particularly practically, an electrically insulating and heating-conductive cover plate of a ceramic can be provided between the second electrical contact plate and the base plate. Said cover plate ensure on the one hand electrical insulation of the second electrical contact plate with respect to the base plate without negatively affecting the thermal coupling of the heating elements to the base plate. Alternatively to such a cover plate of ceramic, it can also be conceived to apply silicone adhesive between electrical contact plate and base plate, which has electrical and heat-conductive properties that are similar to said ceramic materials.

A particularly favourable thermal coupling of the heating elements to the base plate however can be achieved when the insulating plate on a side facing the base plate is provided with a surface geometry which is substantially formed complementarily to the base plate.

An embodiment, in which the fluid path provided in the base plate is formed through a flat tube that is arranged on the side facing the insulating plate and through which a coolant or refrigerant can flow, which extends at least in sections along a longitudinal direction of the base plate proves to be particularly favourable in terms of construction space. The term "flat tube" in this case defines in particular fluid lines of any type the height of which amounts to a maximum of a quarter, most preferentially a maximum of a tenth of their width. A flat tube designed in this manner makes possible an areal contact of the fluid flowing through the flat tube with the base plate.

A particularly favourable cooling output can be achieved in this case when in the base plate not only a single such flat tube is provided, but multiple flat tubes—preferably at least two, particularly preferably four such flat tubes—are arranged, which consequently extend along a longitudinal direction of the base plate spaced from and substantially parallel to one another on the base plate.

Particularly preferable in terms of production is an embodiment, in which the flat tube(s) is/are each integrally moulded on the base plate. Alternatively to this, the flat tubes can also be fastened to the base plate by means of soldering or welding.

In order to keep the installation space required for the heating and cooling apparatus as small as possible and to preferably greatly reduce the thermal losses that occur in the heating and cooling apparatus in this manner, it is recommended with an advantageous further development to alternatingly arrange the flat tubes of the base plate in an assembled state of the heating and cooling apparatus with respect to a common transverse direction of base plate and insulating plate next to one another. Since the passage openings of the insulating plate serve for receiving the support parts containing the heating elements, a homogeneous distribution of the heating and cooling elements laterally on the base plate is achieved in this manner, as a result of which in turn a particularly advantageous, even heating or cooling of the base plate is achieved.

In an embodiment that is particularly suitable for the temperature control for example of a lithium-ion battery, the base plate can be provided with four flat tubes and the insulating plate with three passage openings, wherein in each passage opening a support part each provided with electric heating elements is arranged.

In order to keep the wiring effort for the electrical contacting of the electrical contact plates towards the outside, for the connection to an electrical energy supply unit as low as possible, it is proposed with a further-developed embodiment to mechanically rigidly and electrically conductively connect the first and second electrical contact plates arranged in the three passage openings in each case by means of at least one connecting brace. To this end it is obvious to integrally mould the connecting brace on the respective electrical contact plate or to fasten these to the electrical contact plates concerned for example by means of a soldering process. Since the respective three first or three second electrical contact plates in the assembled state are substantially arranged parallel to one another it is obvious to form the connecting braces as cross braces.

For a simplified receiving of the connecting braces during the inserting of the support parts in the passage openings of the insulating plate it is advisable to provide a receiving groove each designed complementarily to the connecting brace in the insulating plate.

A particularly homogeneous heating output can be achieved with the heating and cooling apparatus according to the invention when in each support part five heating elements are provided.

Particularly practically, PTC heating elements which are designed plate-like can be utilised as heating elements. Their generally plate-like structure allows using these in the heating and cooling apparatus according to the invention without major design modifications. Such PTC elements are commercially available and have outer dimensions which are suitable for use in the heating and cooling apparatus according to the invention. Conceivable for example are PTC elements with a length of approximately 35 mm and a width between 4 mm and 14 mm with a maximum height of 2 mm.

The invention furthermore relates to a battery arrangement for a motor vehicle with a battery, in particular a lithium-ion battery and with a heating and cooling apparatus that is thermally coupled to the battery having one or multiple of the previously mentioned features. The thermal coupling in this case can be realised by fastening the battery to the heating and cooling apparatus, for example in the region of the base plate. Fastening in the region of the cover plate or laterally on the heating and cooling apparatus is also conceivable.

A version, in which the battery to be heated or cooled by the heating and cooling apparatus is simultaneously used as energy supply unit for supplying the heating element of the heating and cooling apparatus with electric energy proves to be particularly elegant.

Finally, the invention relates to a motor vehicle with a battery arrangement introduced above.

Further important features and advantages of the invention are obtained from the subclaims, from the drawings and from the associated figure description with the help of the drawings.

It is to be understood that the features mentioned above and still to be explained in the following cannot only be used in the respective combination stated but also in other combinations or by themselves without leaving the scope of the present invention.

Preferred exemplary embodiments of the invention are shown in the drawings and are explained in more detailed in the following description, wherein same reference characters relate to same or similar or functionally same components.

BRIEF DESCRIPTION OF THE DRAWINGS

It shows, in each case schematically.

DETAILED DESCRIPTION

Figure 1:
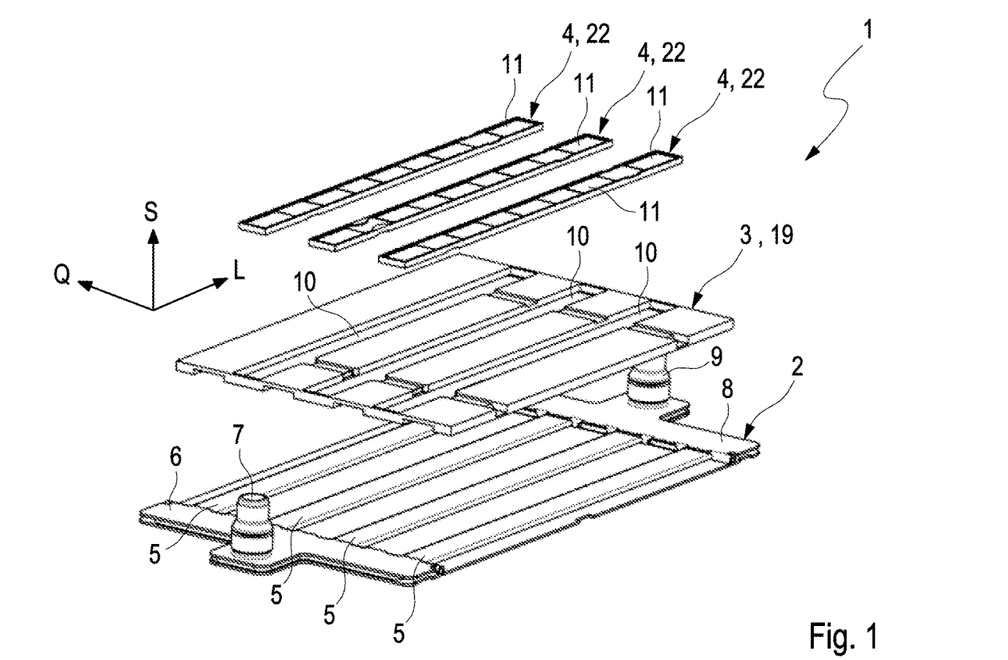
FIG. 1-7 a first exemplary embodiment of a heating and cooling device according to the invention in various representations, FIG. 8-10 a second exemplary embodiment of a heating and cooling device according to the invention, likewise in various representations.

Illustrated in FIG. 1 in an exploded representation are a base plate 2, an insulating element designed as an insulating plate 3 and three support parts 4 for receiving heating elements 11. In the example scenario of FIG. 1, four flat tubes 5 each extend along a longitudinal direction L of the base plate 2—i.e. substantially parallel to one another—, which can be soldered, welded or integrally moulded on the base plate 2. These define a fluid path for a coolant or refrigerant and are subjected to a through-flow of a coolant, for example water-glycol, or a refrigerant, which is commercially known for example under the designations "R134a", "R1234yF", or "R744" for cooling a battery (not shown) that is thermally coupled to the base plate 2. The four flat tubes 5 make possible a large-area contact of the fluid flowing through them with the base plate 2 and thus a good thermal coupling of the fluid to the battery to be cooled. Introducing the coolant or refrigerant may be realised for example with the help of a common fluid feed line 6, which in the example scenario of FIG. 1 extends along a transverse direction Q running orthogonally to the stack direction S and to the longitudinal direction L, is provided with an inlet opening 7 and fluidically communicates with a with respect to the longitudinal direction L first end portion of the four flat tubes 5. Accordingly, a common fluid discharge line 8 with an outlet opening 9 may be provided on the base plate 2, which is fluidically connected to the four flat tubes 5 on a second axial end portion located opposite the first axial end portion and which likewise extends along the transverse direction Q.

Figure 5:
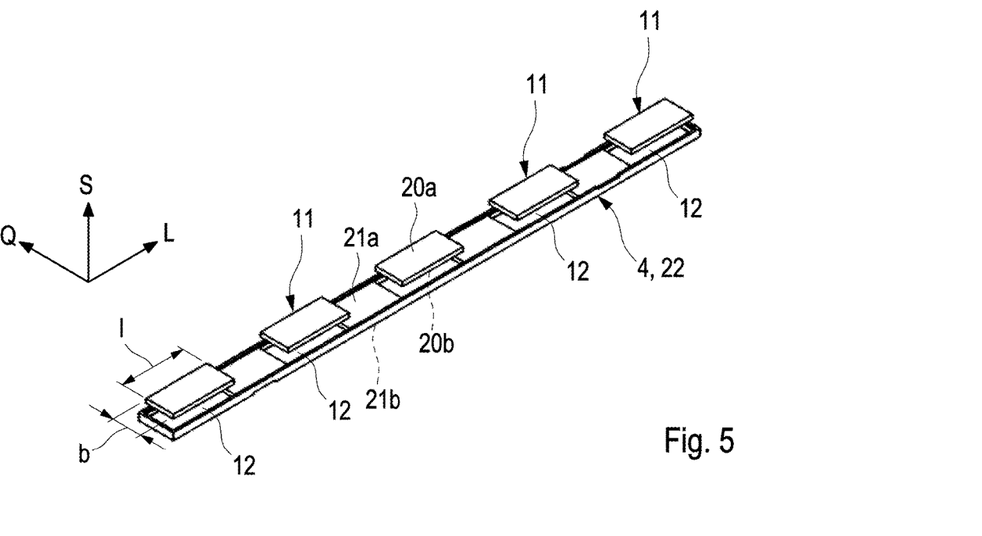

FIG. 5 shows a detail representation of one of the three support parts 4 shown in FIG. 1. Accordingly, the support part 4 is constructed in the manner of an elongated support frame 22 and provided with five passage openings 12 which are arranged adjacent to and spaced from one another along the longitudinal direction L. The passage openings 12 have dimensions with respect to their length l and width b which substantially correspond to those of the five heating elements 11, which in an assembled state are inserted in the passage openings 12. Typically, said length l of the heating elements 11 or of the passage openings 12 each amounts to approximately 30 mm and their width to between 4 mm and 13 mm. Ideally, support part 4 and heating elements 11 also have an almost identical component thickness, for example approximately 2 mm, so that the top side and bottom side of each heating element 11 following the inserting into a passage opening 12 is aligned with the top or bottom side of the support part 4. For fixing the heating elements 11 in the passage openings 12, these can be glued to the support part 4.

The support part 4 and the support frame 22 respectively are designed in such a manner that the top sides 20a of the at least two heating elements 11 in each case terminate flush with a top side 21a of the support frame 22 and of the support part 4 respectively. Accordingly, the bottom sides 20b of the at least two heating elements 11 each also terminate flush with a bottom side 21b of the support frame 22 and of the support part 4 respectively.

Figure 2:
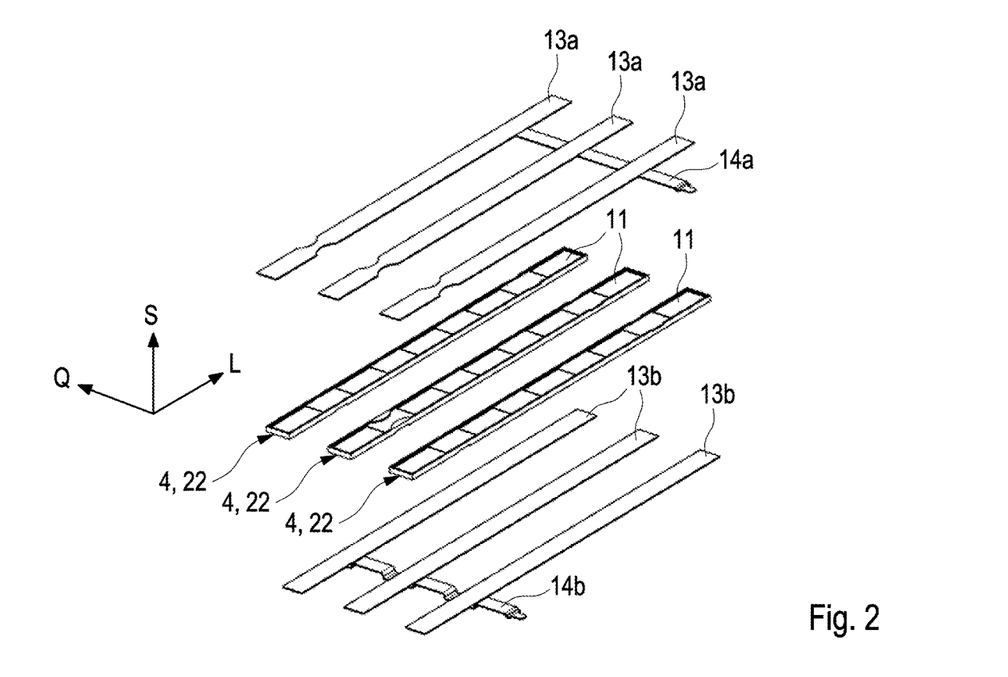
Figure 3:
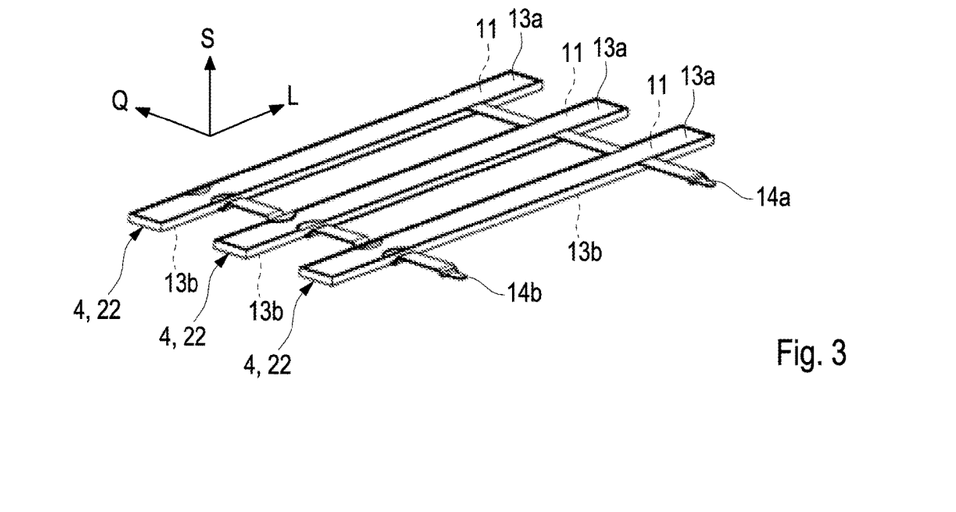

FIG. 2 shows a particularly practical way of producing an electrical connection led from the electric heating elements 11 of the heating and cooling apparatus 1 to the outside in order to supply the same with electric energy from an energy supply unit—the battery to be temperature-controlled by means of the heating and cooling apparatus 1 can also be utilised for this purpose. To this end, a first and second electrical contact plate 13a, 13b of metal each is positioned in each of the three support parts 4 namely in such a manner that the heating elements 11 which are arranged in the passage openings 12 of the support parts 4 are located sandwich-like between the two contact plates 13a, 13b. For the case that the electrical connection elements of the heating elements 11 are realised via an electrically conductive formation of the top and bottom side of the heating element 11 it is obvious to produce the electrical connection between the electrical contact plates 13a, 13b and the heating elements 11 by gluing the contact plates 13a, 13b onto the top and bottom sides respectively of the heating elements 11 by means of an electrically conductive adhesive. From the representation of FIG. 2 it is evident furthermore that the three first electrical contact plates 13a are electrically connected to one another both mechanically and also electrically by means of a first connecting brace 14a extending transversely to the support parts 4 which are arranged along the longitudinal extension direction L. This applies analogously to the three second electrical contact plates 13b and a connecting brace 14b connecting these electrically and mechanically.

Figure 4:
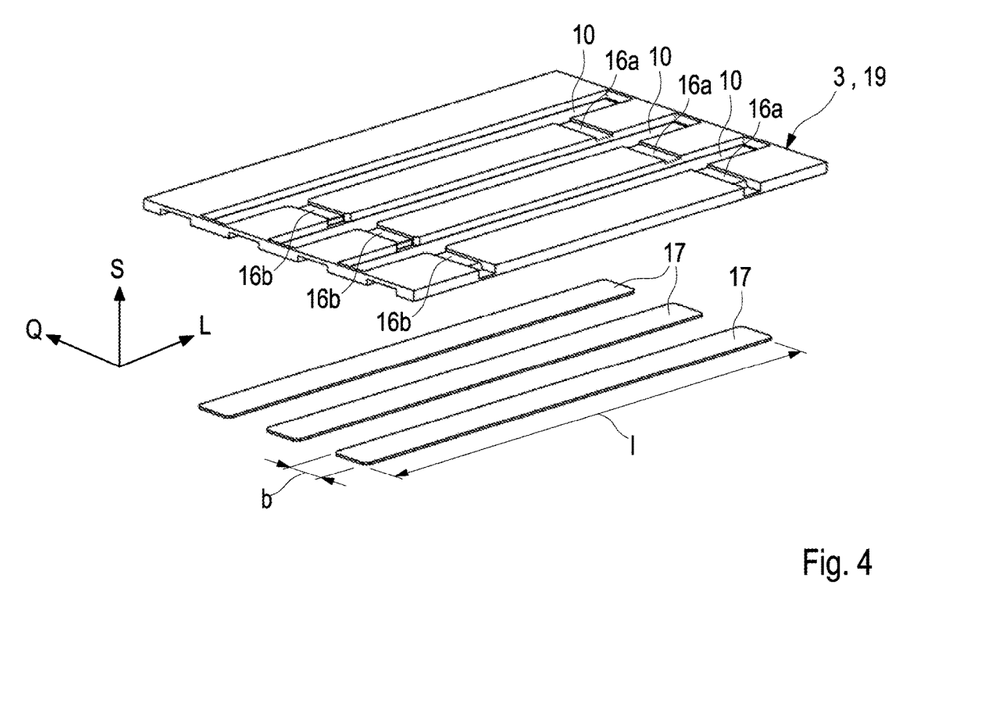

FIG. 4 illustrates the insulating plate 3 shown in FIG. 1 in a separate representation. The insulating plate 3 has three passage openings 10 which extend in longitudinal direction L and are arranged adjacent to one another, into which the support parts 4 shown in FIG. 5 can be inserted. The passage openings 10 can be designed substantially complementarily to a respective support part 4. For receiving the connecting braces 14a, 14b in the insulating plate 3, recesses 16a, 16b in the manner of receiving grooves are provided in said insulating plate 3 which are complementary to the connecting braces 14a, 14b.

In order to prevent an undesirable electrical contact of the electrical contact plates 13b with the base plate 2 when the insulating plate 3 is mounted on the base plate 2—which can consist of an electrically conductive material—, electrically insulating cover plates 17 of a ceramic can be arranged between the electrical contact plates 13b and the base plate 2, which with respect to their width b and length l can have the same dimensions as the support parts 4. This is evident from the representation of FIG. 4, which shows three such cover plates 17.

Figure 6:
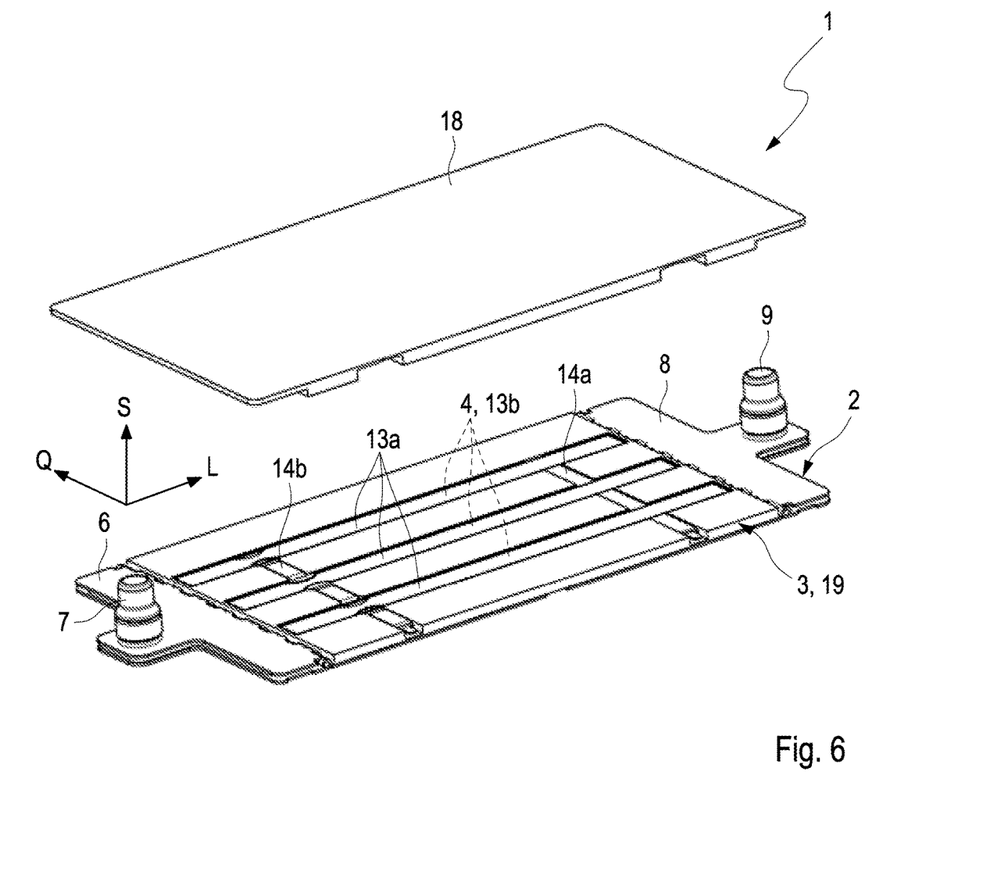

The heating and cooling apparatus 1 shown in FIG. 6 is completed by a fastening of the cover plate 18 on the base plate 2 or on the insulating plate 3—for example through gluing. This figure furthermore shows that the four flat tubes 5 of the base plate 2—these are concealed by the insulating plate 3 in the representation of FIG. 6—and the three support parts 4 are arranged along the transverse direction Q alternately and adjacently to one another. In this way, a homogeneous distribution of the heating and cooling elements laterally on the base plate 2 is achieved, with which in terms of operation even heating or cooling of the base plate 2 can be achieved.

Figure 7:
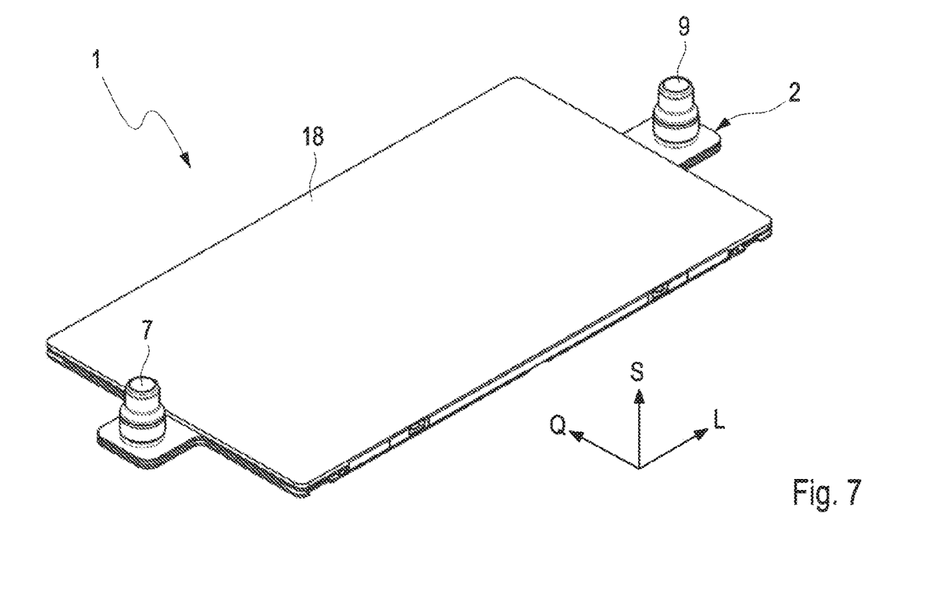

FIG. 7 finally shows the heating and cooling apparatus 1 in a mounted state thus ready for operation. In this state, base plate 2, support part 4, insulation 19 and cover plate 18 are arranged along the stack direction S adjacently to one another (see also FIG. 6 in this respect) which in each case runs orthogonally to the transverse direction Q and to the longitudinal direction L.

Figure 8:
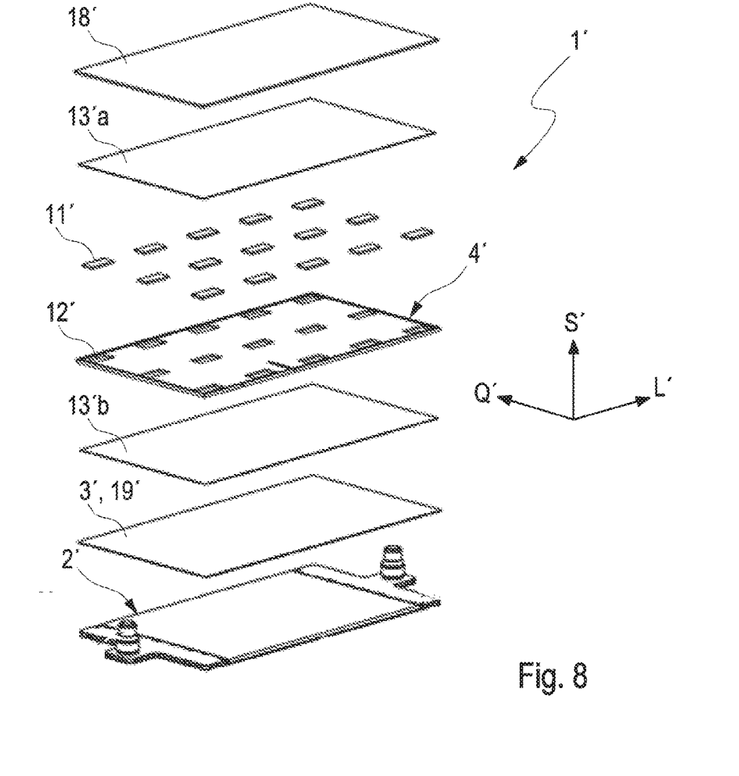
Figure 9:
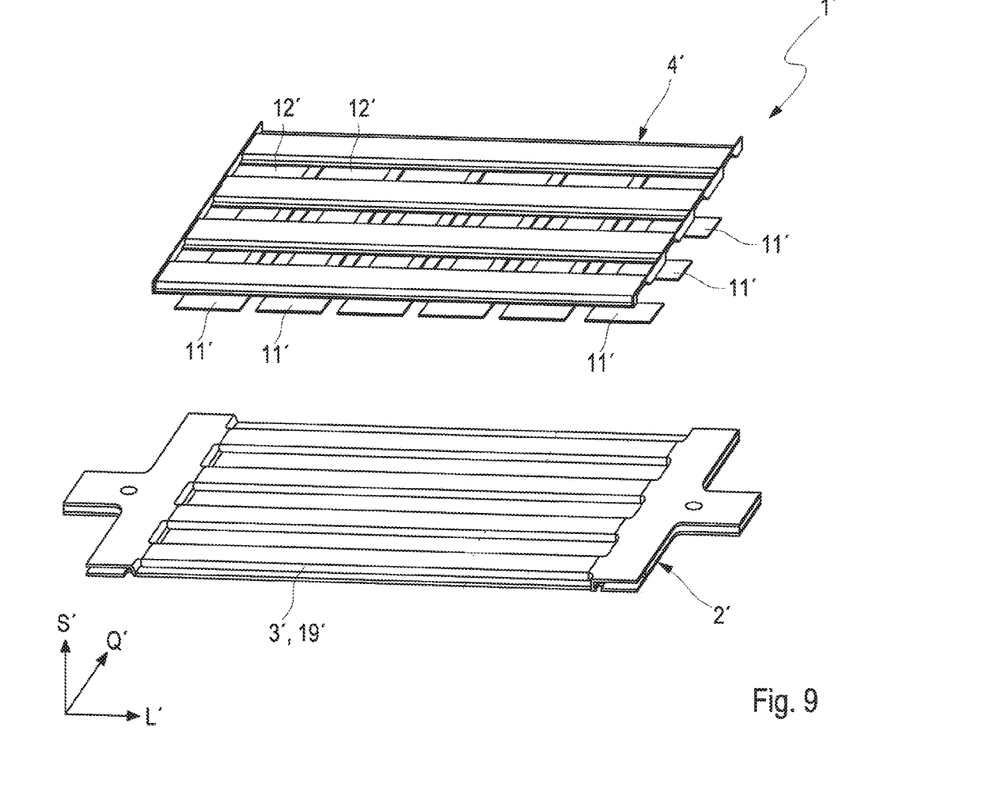
Figure 10:
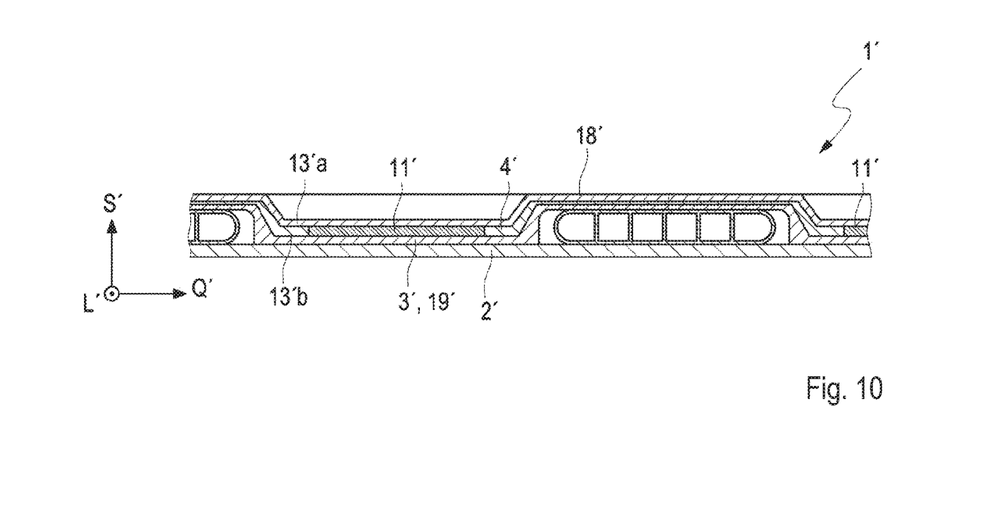

In FIG. 8, a second exemplary embodiment of a heating and cooling apparatus 1' according to the invention is shown schematically and in an exploded representation. FIG. 9 shows a perspective detail representation of the support part 4', the upper electrical contact plate 13'a and the base plate 2'; FIG. 10 shows a cross section of the heating and cooling apparatus 1' in a finish-assembled state.

The example shown in the FIGS. 8 to 10 shows a heating and cooling apparatus 1' according to the invention in a sandwich arrangement. The heating and cooling apparatus 1' differs from the example according to FIG. 1 in particular in that only a single support part 4' is provided, in which passage openings 12' arranged grid-like are provided. This illustrates the perspective view of FIG. 9, which shows the support part 4' in the form of a support frame with a total of 18 such passage openings 12'. The heating and cooling apparatus 1' each comprises only a single common first and common second electrical contact plate 13'a, 13'b, which in stack direction S' are each arranged sandwich-like between support part 4' and cover plate 18' or between insulating plate 2' and support part 4' respectively. On an outer edge of the two electrical contact plates 13'a, 13'b, which can for example be designed as shaped sheet metal parts, electrical connection elements for connecting the heating elements 11' to an energy supply unit can be provided (not shown). The insulation 19' can be formed as an insulating plate 3' from a ceramic; alternatively to this, an insulating film of an electrically insulating material can also be arranged on the base plate 2' or an electrically insulating layer applied onto the base plate 2' can be provided.

The invention claimed is:

1. A heating and cooling apparatus for a battery, comprising:
    a base plate including at least one fluid path for flowing-through of at least one of a coolant and a refrigerant;
    at least two support parts each including at least two first passage openings, the at least two first passage openings respectively having an electrical heating element arranged therein that is thermally coupled to the base plate;
    an electrical insulation plate including at least two second passage openings;
    a cover plate;
    wherein the base plate, the at least two support parts, the electrical insulation plate and the cover plate are arranged in a stack along a stack direction, and the electrical insulation plate disposed between the base plate and cover plate in the stack direction; and
    wherein the at least two second passage openings extend through the electrical insulation plate in the stack direction and are spaced from one another in the electrical insulation plate, and wherein each of the at least two support parts are arranged in a respective one of the at least two second passage openings of the electrical insulation plate.

2. The heating and cooling apparatus according to claim 1, wherein the at least two support parts each define an elongated support frame extending along a longitudinal direction running orthogonally to the stack direction;
    the at least two first passage openings extend through the elongated support frame of the at least two support parts in the stack direction and are spaced separate from one another along the longitudinal direction; and
    the elongated support frame of the at least two support parts defines a transverse section separating the at least two first passage openings from one another, the transverse section extending along a transverse direction running orthogonally to the stack direction and the longitudinal direction.

3. The heating and cooling apparatus according to claim 2, wherein at least one of:
    the heating element has a respective top side that terminates flush with a top side of the support frame defined by each of the at least two support parts; and
    the heating element has a respective bottom side that terminates flush with a bottom side of the support frame defined by each of the at least two support parts.

4. The heating and cooling apparatus according to claim 1, the electrical insulation plate is composed of an electrically insulating material.

5. The heating and cooling apparatus according to claim 4, further comprising an electrically conductive contact plate provided between the at least two support parts and the electrical insulation plate for electrically connecting to an external energy supply unit.

6. The heating and cooling apparatus according to claim 1, wherein the at least two second passage openings provided in the electrical insulation plate are shaped complementary to the at least two support parts.

7. The heating and cooling apparatus according to claim 1, wherein the at least two support parts are arranged sandwiched in the at least two second passage openings of the electrical insulation plate between the base plate and the cover plate.

8. The heating and cooling apparatus according to claim 1, wherein the electrical insulation plate on a side facing the base plate has a surface geometry shaped complementary to the base plate.

9. The heating and cooling apparatus according to claim 1, wherein the at least one fluid path provided in the base plate includes at least one flat tube, the at least one flat tube extending along a longitudinal direction of the base plate.

10. The heating and cooling apparatus according to claim 9, wherein the at least one flat tube includes at least two flat tubes extending along the longitudinal direction of the base plate and spaced apart from one another on a side of the base plate facing the electrical insulation plate.

11. The heating and cooling apparatus according to claim 10, wherein the at least two second passage openings of the electrical insulation plate and the at least two flat tubes of the base plate are arranged alternately next to one another with respect to a transverse direction common to the base plate and the electrical insulation plate, the transverse direction running orthogonally to the longitudinal direction and the stack direction.

12. The heating and cooling apparatus according to claim 9, wherein the at least one flat tube is at least one of integrally moulded on the base plate, soldered onto the base plate, and welded onto the base plate.

13. The heating and cooling apparatus according to claim 1, wherein the heating element arranged in each of the at least two first passage openings of the at least two support parts is a positive temperature coefficient (PTC) heating element.

14. The heating and cooling apparatus according to claim 1, wherein the electrical insulation plate has a transversely extending recess disposed between the at least two second passage openings on a side facing towards the cover plate.

15. The heating and cooling apparatus according to claim 1, wherein at least one of:
    the heating element is fixed in a corresponding one of the at least two first passage openings of the at least two support parts via an adhesive; and
    the at least two first passage openings provided in each of the at least two support parts have a rectangular shape.

16. A heating and cooling apparatus for a battery, comprising:
    a base plate including at least one fluid path extending along a longitudinal direction of the base plate for flowing-through of at least one of a coolant and a refrigerant;
    an elongated support frame extending along the longitudinal direction of the base plate, the support frame defining at least two separate passage openings;
    at least two electrical heating elements disposed in the at least two separate passage openings of the support frame, respectively;

an electrical insulation plate defining a passage opening extending along the longitudinal direction of the base plate;
a cover plate;
the base plate, the support frame, the electrical insulation plate, and the cover plate arranged in a stack along a stack direction, the stack direction running orthogonally to the longitudinal direction, wherein the support frame and the electrical insulation plate are disposed between the base plate and the cover plate along the stack direction;
the support frame further defining a first surface and a second surface disposed opposite to the first surface with respect to the stack direction, wherein the at least two separate passage openings extend through the support frame from the first surface to the second surface, and the at least two electrical heating elements are respectively provided in the at least two separate passage openings thermally coupled to the base plate;
wherein the at least two separate passage openings are spaced from one another in the longitudinal direction and separated by a transverse section defined by the support frame, the transverse section extending along a transverse direction running orthogonally to the longitudinal direction and the stack direction; and
wherein the support frame is arranged in the passage opening of the electrical insulation plate.

17. A heating and cooling apparatus for a battery, comprising:
a base plate including at least one fluid path for flowing-through of at least one of a coolant and a refrigerant;
at least two support parts each including at least two first passage openings, and a plurality of electrical heating elements respectively provided in a corresponding one of the at least two first passage openings of the at least two support parts, the plurality of electrical heating elements thermally coupled to the base plate;
an electrical insulation plate including at least two second passage openings;
a cover plate;
the base plate, the at least two support parts, the electrical insulation plate and the cover plate arranged in a stack along a stack direction with the at least two support parts and the electrical insulation plate disposed between the base plate and the cover plate;
a first electrically conductive contact plate provided on a first side of the at least two support parts;
a second electrically conductive contact plate provided on a second side of the at least two support parts, the second side disposed opposite the first side with respect to the stack direction;
wherein the plurality of electrical heating elements are arranged sandwiched in the corresponding one of the at least two first passage openings of the at least two support parts between the first electrically conductive contact plate and the second electrically conductive contact plate; and
wherein each of the at least two support parts are arranged in the at least two second passage openings of the electrical insulation plate, respectively.

18. The heating and cooling apparatus according to claim 17, further comprising an electrically insulating cover plate of a ceramic material provided between the second electrically conductive contact plate and the base plate.

19. The heating and cooling apparatus according to claim 17, wherein the electrical insulation plate on a side facing the base plate has a surface geometry shaped complementary to the base plate.

20. The heating and cooling apparatus according to claim 17, wherein at least one of:
the first electrically conductive contact plate includes at least two first electrically conductive contact plates respectively provided for each of the at least two support parts, the at least two first electrically conductive contact plates mechanically and electrically connected via a first connecting brace; and
the second electrically conductive contact plate includes at least two second electrically conductive contact plates respectively provided for each of the at least two support parts, the at least two second electrically conductive contact plates mechanically and electrically connected via a second connecting brace.

21. The heating and cooling apparatus according to claim 20, wherein the electrical insulation plate defines at least one recess for receiving the at least one of the first connecting brace and the second connecting brace.

* * * * *